United States Patent Office 3,268,626
Patented August 23, 1966

3,268,626
POST-CHLORINATED VINYL CHLORIDE POLYMER CONTAINING BUTADIENE-ACRYLONITRILE RUBBER AND STYRENE-ACRYLONITRILE COPOLYMER
Garland B. Jennings, Bath Township, Akron, and George J. Kliner, Avon Lake, Ohio, assignors to The B. F. Goodrich Company, New York, N.Y., a corporation of New York
No Drawing. Continuation of application Ser. No. 224,250, Sept. 17, 1962. This application Sept. 3, 1964, Ser. No. 394,345
8 Claims. (Cl. 260—891)

This application is a continuation of our copending application, Serial No. 224,250, filed September 17, 1962, now abandoned.

This invention relates generally to thermoplastic polymer compositions which have good mechanical processing properties, high shock resistance and impact strength, high softening points, good heat resistance and resistance to chemical attack. More particularly, this invention relates to normally rigid, novel polymer blends comprising three components in definitely defined proportions; a major portion of post-chlorinated polyvinyl chloride and minor portions of a styrene-acrylonitrile copolymer having specifically defined characteristics, and a cross-linked butadiene-acrylonitrile copolymer of specific composition.

Because of its heat stability, high softening temperature, dimensional stability and corrosion and chemical resistance, the post-chlorinated polyvinyl chloride embodied herein is useful in the manufacture of piping, ductwork, tanks, utensils, appliance and electrical components, automotive parts and other rigid articles, especially where such products will handle or contact hot water and other hot, corrosive liquids, fumes and gases. The post-chlorinated polyvinyl chloride is a thermoplastic resin that can be processed and formed by conventional techniques, such as milling, calendering, extruding, laminating, compression molding, transfer molding and the like, but not with the ease desired in certain commercial applications, for example, in pipe extrusion and calendering, unless softening additives or plasticizers are incorporated therein to improve its processability. But, while improving processability, these additives produce other harmful effects; the compositions are very much more heat sensitive, considerably softer, weaker and less desirable chemically and electrically than the original resin, thus limiting their field of usefulness in the manufacture of rigid plastic articles. In addition, while post-chlorinated polyvinyl chloride has more than adequate shock and impact resistance for most uses, the physical abuse and shocks that pipe and ductwork often encounter require a higher impact strength than this material offers.

It is the object of this invention, therefore, to provide a novel thermoplastic composition which has the substantially unimpaired attributes of the post-chlorinated polyvinyl chloride base resin but which also possess improved processability and shock resistance. Stated differently, it is the object of the present invention to provide a modified, high-impact, post-chlorinated polyvinyl chloride resin blend that is easily worked into useful shapes without such modification materially detracting from its other desirable physical properties. It is a particular object of the invention to provide a polymer mixture having a high heat distortion temperature and adapted to the extrusion into pipe capable of conveying water at a temperature near its boiling point.

The post-chlorinated polyvinyl chloride resin comprising the major constituent of the compositions of this invention has a density within the range of approximately 1.53 to 1.59 gms./cc. at 25° C., a chlorine content of from about 64 to 68% by weight, and a heat distortion temperature (as measured by ASTM test method D648) of from about 95° C. to 125° C., that is, at least about 20° C. higher than the heat distortion temperatures of unchlorinated polyvinyl chloride resins.

The preferred post-chlorinated polyvinyl chloride resins have densities in the range of from about 1.55 to about 1.58 gms./cc. at 25° C., a chlorine content within the range of about 65.4% to 67% by weight and heat-distortion temperatures of at least 100° C. Said post-chlorinated polyvinyl chloride resins are not degraded in the unmodified condition when heated in the air for at least 10 minutes at 375° F. to 400° F. The resins are substantially insoluble in acetone but are soluble in tetrahydrofuran. U.S. Patent No. 2,996,489 and No. 3,100,762 described these post-chlorinated polyvinyl chloride resins in considerable detail and give methods for their preparation.

It has now been discovered that the aforesaid unplasticized, post-chlorinated polyvinyl chloride resins are rendered easily processable and made more shock resistant by incorporating therein small amounts of both (1) a hard, horny styrene-acrylonitrile copolymer containing from about 20% to about 35% by weight of polymerized acrylonitrile units, based on the total weight of the copolymer, and having a dilute solution viscosity (as hereinafter defined) of from 0.3 to 0.7, and (2) a rubbery, cross-linked butadiene-acrylonitrile copolymer containing from about 20% to about 30% by weight of polymerized acrylonitrile units, based on the total weight of the copolymer. By small amounts is meant from 1 to 15 parts by weight of styrene-acrylonitrile copolymer resin and from 3 to 15 parts by weight of butadiene-acrylonitrile copolymer rubber per 100 parts by weight of post-chlorinated polyvinyl chloride.

As stated above, the hard, horny styrene-acrylonitrile resin blended with the post-chlorinated polyvinyl chloride and the butadiene-acrylonitrile copolymer in accordance with the present invention contains from about 20 to about 35 weight percent of polymerized acrylonitrile, and has a dilute solution viscosity within the range of about 0.3 to 0.7. We have discovered that these properties are critical. Copolymers which do not fall within these unexpectedly narrow restrictions on composition and molecular weight (as defined by the dilute solution viscosity thereof) are not operative in our invention. Blended compositions using a styrene-acrylonitrile copolymer resin not encompassed within the boundaries as set forth will have poor processability and/or unimproved impact strength.

The dilute solution viscosity (DSV) of a polymer is directly related to its molecular weight. The DSV was determined herein by means of an Ostwald viscometer on a 0.25 percent solution of the styrene-acrylonitrile resin in methyl ethyl ketone at 25° C.; the DSV was calculated as the natural logarithm of the ratio of the flow time of the solution to the flow time of the pure solvent divided by the concentration of the polymer solution in grams per 100 ml.

The styrene-acrylonitrile copolymers may be prepared by bulk, solution, suspension or emulsion polymerization techniques. These procedures are well known to those skilled in the art. We used the preferred emulsion polymerization method such as is described in detail in British Patent No. 590,247. It is necessary to add modifying agents to the monomeric reaction mixture in order to regulate the molecular weight of the product polymer (as determined by the DSV). Generally, the modifiers are the well-known aliphatic mercaptans, mixtures thereof, or alkylated aromatic mercaptans. More particularly, such regulators include isohexyl, decyl, dodecyl, tetradecyl, hexadecyl, octadecyl mercaptans and the like. As the amount of modifier charged to the reaction mixture is increased, the molecular weight (and DSV) of the product resin is lowered. For styrene-acrylonitrile copolymers having dilute solution viscosities of from 0.3 to 0.7, the mercaptan regulator required is from about 3.0 to about 0.05 parts per 100 parts by weight of the monomers, depending on the particular regulator chosen. For instance, 0.9 to 0.25 parts of dodecyl mercaptan per 100 parts of monomer are used to produce a copolymer with a DSV within a range of 0.3 to 0.7.

A typical recipe used for preparing the styrene-acrylonitrile copolymer, in this case having a DSV of 0.3 and an acrylonitrile content of about 35%, was as follows:

| Material: | Parts, weight |
|---|---|
| Water | 260 |
| Styrene | 65 |
| Acrylonitrile | 35 |
| Dodecyl mercaptan (modifier) | 0.9 |
| Potassium persulfate (catalyst) | 0.25 |
| Tetrasodium pyrophosphate (electrolyte) | 0.5 |
| "Santomerse-S" [1] (anionic emulsifying agent) | 3.0 |
| "Tamol-N" [2] (anionic dispersing agent) | 1.0 |

[1] Sodium salt of alkyl aryl sulfonate.
[2] Sodium salt of condensed alkyl naphthalene sulfonic acid.

The reaction was carried out for about ten hours at 35° C. 0.5 part of 2,5-ditertiary hydroquinone was added to the mixture to serve as a reaction terminator. The product was obtained in approximately 95% yield in latex form. The latex was coagulated with calcium chloride solution. The resin was recovered by filtration and dried to give a fine powder product.

The rubbery, coss-linked butadiene-acrylonitrile copolymer employed in this invention contains from about 20% to about 30% by weight of polymerized acrylonitrile based on the weight of copolymer. The preparation by emulsion polymerization techniques of butadiene-acrylonitrile polymers, commonly referred to as nitrile rubber, is well known in the art. Methods for synthesis and product recovery are described in the book, "Synthetic Rubber," by G. S. Whitby, 1954, pages 794 to 804.

The nitrile rubbers specific to the present invention preferably contain some cross-linked polymer. The degree of cross-linking in a rubber is related to its gel characteristics, that is, the fraction thereof that is insoluble in a common solvent such as aromatic hydrocarbons, chlorinated hydrocarbons, ketones, esters, and nitro compounds. The gel characteristics of the rubbers used in the compositions of this invention were measured by the following procedure.

A 0.3 gram sample of the rubber (weighed to an accuracy of 0.0005 grams and cut into strips less than 1 mm. in thickness and about 5 mm. long) is placed on a screen in a weighing bottle containing 75 cc. of methyl ethyl ketone. The bottle is sealed and the sample is kept in the solvent for about 16 hours at 25° C. The cap is then removed from the bottle and the liquid containing the sol or soluble portion of the rubber is carefully siphoned. The amount of sol is determined by evaporating the solution thus recovered, or a portion thereof, to dryness in a tared dish. The fraction of gel is calculated by subtracting the weight of sol from the weight of the original sample and dividing this result by the weight of the original sample.

The partially cross-linked nitrile rubbers preferred herein contain at least about 50% by weight of gel and preferably from about 70 to 95% gel.

The cross-linking in nitrile rubbers can be promoted by working the polymer on a hot roll mill, or by heating the polymer in the presence of a peroxide, both methods being well known. Another much used technique, and most preferred herein, is to induce the formation of cross-linking in the polymer by the addition of suitable cross-linking agents into the polymerization mixture. Cross-linking agents generally are non-conjugated, ethylenically doubly-unsaturated monomers, and include such compounds as divinyl benzene, divinyl sulfone, polyethylene glycol dimethacrylate, and the like, which, by furnishing a tetrafunctional unit, produce a controlled amount of cross-linking which is determined by the quantity used. We have found that the nitrile rubbers most adaptable to the invention herein should be prepared in the presence of approximately from 0.25 to 3 parts of cross-linking agent per 100 parts by weight of butadiene and acrylonitrile monomers. The most useful rubbers are made in the presence of about 0.5 to about 2 parts of cross-linking monomer per 100 parts of the major monomers. A typical reaction mixture for producing an emulsion polymerized butadiene-acrylonitrile copolymer adaptable to the instant invention was as follows:

| Material: | Parts, weight |
|---|---|
| Water | 210 |
| Butadiene | 74 |
| Acrylonitrile | 26 |
| Divinylbenzene | 1.5 |
| Dodecyl mercaptan | 1.0 |
| Potassium peroxydisulfate (catalyst) | 0.3 |
| Sodium carbonate (electrolyte) | 0.15 |
| "Santomerse-S" [1] (anionic emulsifying agent) | 2.0 |
| "Tamol-N" [2] (anionic dispersing agent) | 1.0 |

[1] Sodium salt of alkyl aryl sulfonate.
[2] Sodium salt of condensed alkyl naphthalene sulfonic acid.

The reaction was carried out for about 35 hours at 30° C. 0.5 part of hydroxyl ammonium sulfate was added to act as a reaction terminator. The product was obtained in approximately 90% yield in the form of a latex, which was then coagulated with calcium chloride solution. The rubber coagulant was recovered by filtration and dried to give a final product in the form of small crumbs. Prior to coagulation it is usually desirable to add small amounts, e.g., 0.5 to 3 parts, of a conventional antioxidant.

As aforementioned, the unique blends of this invention are comprised of from about 1 to about 15 parts of the critical styrene-acrylonitrile copolymer and from about 3 to about 15 parts of the specified butadiene-acrylonitrile copolymer per 100 parts by weight of post-chlorinated polyvinyl chloride. The preferred ranges of both the styrene-acrylonitrile resin and the nitrile rubber are from about 5 to 10 parts of each per 100 parts of the chlorinated polymer. These quantities of resin and rubber produce a blend with good shock resistance and the best processability.

The compositions embodied herein may be physically mixed by any means that produces a homogeneous blend of the components. For instance, the particulate post-chlorinated polyvinyl chloride, the granular or powdery styrene-acrylonitrile copolymer, and the crumb-like, rubbery butadiene-acrylonitrile copolymer are intimately dry-blended in a spiral ribbon mixer or other suitable powder mixing apparatus. If convenient, the resins can be fusion (melt)-blended in a heated Banbury mixer or plastic roll mill starting with either the powdery mixture as prepared above or with the unmixed materials. Fusion-blending obviously products a more homogeneous mixture; however, it is more costly and like all thermoplastic polymers, the composition is degraded to some extent by heat. The fusion-blended mixture may be calendered into sheets, or extruded through small dies and pelletized to produce an easily handled intermediate product. The mixtures of resin and rubber herein described are most useful for extrusion into pipe having generally smooth and glossy surface appearance and suitable for conveying water at an elevated temperature, within the range of at least 85° C. to about 100° C., and in the preferred embodiments, water having a temperature of at least 90° C. may be conveyed.

Examples

The following specific examples serve to illustrate and clarify the invention by describing specific embodiments thereof and by presenting substantiating data.

Samples were prepared as follows: A portion of the dry-powdery mixture of resins and rubber prepared in the aforementioned manner by powder mixing was transferred directly to a six-inch diameter, twelve inch long, two roll plastic mill having its rolls maintained at 350° to 400° F. The mill rolls were first closely spaced and the powdery mix passed through the rolls. The stock was fused after several passes, and the milling continued until a smooth rolling bank was attained; this period depended upon the processing characteristics of the blend. The average stock temperature was around 370 to 420° F. The rolls were then opened slightly and a sheet removed from the unit. Samples of this sheet were used to determine the physical (mechanical and thermal) properties of the polymer composition as hereinafter described.

The milling operation was one means employed to determine the relative processability of the mixture. Its adaptability to roll mill mastication and subsequent sheeting was noted by observing, for example, the time required to form a band on the roll and the quality and uniformity of same, to what degree the plastic formed a smooth rolling feed bank between the rolls, and finally, the texture and appearance of the product sheet.

The tensile strength of the blend was determined by ASTM test method D638–60T, and the impact resistance (Izod) was measured by ASTM method D256–56. The heat distortion or deflection temperature was determined by ASTM method D648–56 using sheets of material 0.125 to 0.150 inch thick. The heat stability observations were made by subjecting a sample to a temperature of 375° F. in the air and recording the time at which the composition became either brown, black, blistered, "blown-up," or otherwise degraded.

To verify improvement in processability, portions of powdery mixtures of representative compositions were extruded as straight, rigid pipe having a wall thickness of about 0.06 inch and a cross-sectional diameter of about 0.75 inch using a plastic extruder having its barrel heated from 300° to 360° F., its die heated to 350–380° F. and a neutral (not heated or cooled) 1.5 inch diameter screw. The stock or extrudate temperature at the die orifice ranged from about 405° to 420° F. The processability of a polymer composition was determined by measuring extrusion rate and observing the quality and appearance of the extruded pipe. The extrusion operation is a more exacting test for determining processability than is roll-milling because a plastic that is susceptible to milling may not always be suitable for extrusion.

The density of the post-chlorinated polyvinyl chloride used in the formulations of the examples ranged from 1.55 to 1.572 gms./cc. at 25° C. (chlorine content of 65.4 to 66.8%). Table I, set forth below, tabulates the data pertinent to examples cited that are illustrative of the compositions of our invention.

TABLE I

| Ex. No. | Copolymer Modifiers SA[1] | | BA[2] | | Mechanical Properties | | Thermal Properties | | Extrusion Characteristics | | | |
|---|---|---|---|---|---|---|---|---|---|---|---|---|
| | Percent A[3] | DSV[4] | Phr.[5] | Percent A[3] | Phr.[5] | Tensile, lbs./sq. in. | Izod Impact, ft.-lb./in. of notch | Heat Distortion Temp., °C. | Heat Stability, min. at 375° F. | In./min. | Gms./min. | ms./in. | Appearance |
| 1 | | | Control | | 5 | 9,000 | 0.7 | 110 | 90 | Unable to extrude | | | |
| 2 | 20 | 0.3 | 5 | 20 | 5 | 7,800 | 1.5 | 100 | 90 | 44 | 198 | 4.5 | Smooth, slight gloss. |
| 3 | 20 | 0.3 | 10 | 20 | 5 | 7,800 | 2.1 | 97 | 90 | 44 | 198 | 4.5 | Do. |
| 4 | 20 | 0.3 | 5 | 20 | 5 | 7,700 | 4.2 | 99 | 75 | | | | |
| 5 | 20 | 0.3 | 5 | 24 | 5 | 7,700 | 4.0 | 95 | 60 | | | | |
| 6 | 20 | 0.6 | 5 | 20 | 5 | 7,800 | 3.1 | 95 | 60 | | | | |
| 7 | 20 | 0.6 | 5 | 24 | 5 | 7,800 | 3.6 | 95 | 60 | | | | |
| 8 | 25 | 0.6 | 5 | 20 | 5 | 7,000 | 3.2 | 96 | 60 | | | | |
| 9 | 25 | 0.6 | 5 | 24 | 5 | 7,700 | 3.5 | 97 | 60 | | | | |
| 10 | 26 | 0.3 | 5 | 20 | 5 | 7,800 | 2.7 | 95 | 60 | | | | |
| 11 | 26 | 0.3 | 5 | 24 | 5 | 7,700 | 3.2 | 96 | 60 | | | | |
| 12 | 35 | 0.3 | 1 | 28 | 5 | 7,100 | 9.1 | 95 | 75 | 47 | 180 | 3.8 | Slight ripple, slight gloss. |
| 13 | 35 | 0.3 | 2.5 | 28 | 5 | 7,300 | 6.4 | 97 | 75 | 46 | 175 | 3.8 | Smooth, slight gloss. |
| 14 | 35 | 0.3 | 5 | 28 | 5 | 7,400 | 7.4 | 95 | 75 | 50 | 186 | 3.7 | Do. |
| 15 | 35 | 0.3 | 7.5 | 28 | 5 | 7,400 | 3.2 | 95 | 75 | 53 | 191 | 3.6 | Do. |
| 16 | 35 | 0.3 | 10 | 28 | 5 | 7,200 | 2.2 | 95 | 75 | 58 | 192 | 3.3 | Do. |
| 17 | 35 | 0.3 | 5 | 20 | 5 | 7,400 | 1.9 | 96 | 90 | 48 | 206 | 4.3 | Do. |
| 18 | 35 | 0.3 | 10 | 20 | 5 | 7,400 | 1.9 | 96 | 90 | 56 | 216 | 3.9 | Smooth, glossy. |
| 19 | 35 | 0.45 | 1 | 20 | 5 | 7,300 | 4.5 | 100 | 75 | 47 | 178 | 3.8 | Slight ripple, slight gloss. |
| 20 | 35 | 0.45 | 2.5 | 20 | 5 | 7,500 | 5.8 | 98 | 75 | 47 | 179 | 3.8 | Do. |
| 21 | 35 | 0.45 | 5 | 20 | 5 | 7,500 | 5.8 | 97 | 75 | 49 | 187 | 3.8 | Smooth, slight gloss. |
| 22 | 35 | 0.45 | 7.5 | 20 | 5 | 7,300 | 3.0 | 99 | 75 | 50 | 189 | 3.8 | Do. |
| 23 | 35 | 0.45 | 10 | 20 | 5 | 7,600 | 3.1 | 95 | 75 | 50 | 188 | 3.8 | Do. |
| 24 | 35 | 0.4 | 3 | 26 | 5 | 7,600 | 1.0 | 99 | 45 | 51 | 208 | 4.1 | Slight ripple, slight gloss. |
| 25 | 35 | 0.4 | 5 | 26 | 5 | 8,500 | 1.4 | 99 | 45 | 56 | 219 | 3.9 | Smooth, slight gloss. |
| 26 | 35 | 0.4 | 10 | 26 | 5 | 7,200 | 1.0 | 93 | 45 | 64 | 220 | 3.4 | Smooth, glossy. |
| 27 | 35 | 0.4 | 5 | 26 | 6 | 8,300 | 1.5 | 99 | 45 | 55 | 217 | 4.0 | Smooth, slight gloss. |
| 28 | 35 | 0.4 | 5 | 26 | 8 | 8,200 | 1.6 | 96 | 45 | 54 | 207 | 3.8 | Smooth, glossy. |
| 29 | 35 | 0.4 | 5 | 26 | 10 | 7,800 | 1.6 | 94 | 45 | 54 | 197 | 3.7 | Do. |
| 30 | 35 | 0.3 | 5 | 20 | 5 | 7,700 | 3.4 | 97 | 60 | | | | |
| 31 | 35 | 0.3 | 5 | 24 | 5 | 7,700 | 3.5 | 95 | 60 | | | | |
| 32 | 35 | 0.48 | 5 | 20 | 5 | 8,000 | 3.2 | 103 | 60 | | | | |
| 33 | 35 | 0.48 | 5 | 24 | 5 | 7,700 | 2.8 | 102 | 60 | | | | |
| 34 | 35 | 0.48 | 5 | 28 | 5 | 8,000 | 1.5 | 100 | 60 | | | | |
| 35 | 35 | 0.64 | 5 | 20 | 5 | 8,100 | 3.7 | 103 | 60 | | | | |
| 36 | 35 | 0.64 | 5 | 24 | 5 | 7,900 | 2.2 | 102 | 45 | | | | |
| 37 | 35 | 0.64 | 5 | 28 | 5 | 8,100 | 1.8 | 99 | 60 | | | | |
| 38 | 35 | 0.71 | 10 | 26 | 5 | 7,900 | 1.3 | 99 | 60 | 44 | 161 | 3.7 | Smooth, slight gloss. |

[1] SA = styrene-acrylonitrile copolymer.
[2] BA = butadiene-acrylonitrile cross-linked copolymer.
[3] Percent A = percent acrylonitrile in copolymer by weight.
[4] DSV = dilute solution viscosity.
[5] Phr = parts of copolymer per 100 parts by weight of post-chlorinated polyvinyl chloride.

The results show the improvements in impact strength and processability of the compositions of our invention when compared with the control resin, post-chlorinated polyvinyl chloride having no copolymers mixed therewith. The unmodified resin had an Izod impact value of 0.7 ft.-lb./in. and showed very poor processing characteristics. Specifically, on the plastic mill the control polymer required at least eight passes through the rolls in which to form a band, the bank was stiff and not uniform and the milled sheet had a very rough surface. In contrast, our novel compositions showed very good milling, that is to say, a uniform band was formed in a minimum number of passes, four or less, the bank was excellent, and a smooth, glossy sheet was recovered. The impact values thereof were significantly increased, ranging from greater than 1 up to 9 ft.-lbs./in.

Unlike the compositions of our invention, the control resin would not extrude into pipe. The extrusion rates and product appearance and quality were best for the three-component blends containing 5 to 10 phr. of styrene-acrylonitrile copolymer wherein the polymerized content of acrylonitrile was about 35 wt. percent of said copolymer and wherein the DSV was 0.3 to 0.45. Dividing the extrusion rate in grams per minute by the rate in inches per minute gives a figure in grams per inch which is a measure of comparative product quality for acceptable extrudates. The lower this ratio, as a general rule, the better the product because a high weight indicates more undesirable swelling of the resin at the die opening. This figure has a surprisingly small variation for the range of compositions embodied herein.

Generally speaking, the described modification of the post-chlorinated polyvinyl chloride slightly impairs the tensile strength and thermal properties, but not to the extent that the usefulness of the plastic is limited in any way. For instance, a tensile strength of 5000 lbs./sq. in. is considered to be much in excess of that required for rigid plastic articles. The heat distortion temperatures of the compositons embodied herein are approximately 25° to 40° C. higher than those of the conventional, rigid, unchlorinated polyvinyl chloride resins (about 65° C. to 75° C.). The heat stabilities of our compositions are generally immaterially lessened.

The examples presented in Table II, below, show that when the properties of the styrene-acrylonitrile resin are outside the ranges specified with respect to composition or DSV, or when the composition of the butadiene-acrylonitrile rubber is not within the narrow range previously set forth, the chlorinated polymer blends therewith have reduced or essentially the same impact strength, or they have poor processing characteristics, i.e., they extrude into very rough unacceptable products. For instance, Examples 39 through 43 illustrate that when the DSV of the styrene-acrylonitrile resin is too low or high, then the three component blends have either low impact values or produce poor quality extrusions. Examples 44 through 48 illustrate the necessity of keeping the acrylonitrile content of either of the copolymers within the limits specified.

TABLE II

| Ex. No. | Copolymer Modifiers ||||| Mechanical Properties || Thermal Properties || Extrusion Characteristics ||||
|---|---|---|---|---|---|---|---|---|---|---|---|---|---|
| | SA¹ ||| BA² || Tensile, lbs./sq. in. | Izod Impact, ft.-lb./in. of notch | Heat Distortion Temp., °C. | Heat Stability, min. at 375° F. | In./min. | Gms./min. | Gms./in. | Appearance |
| | Percent A³ | DSv⁴ | Phr.⁵ | Percent A¹ | Phr.⁵ | | | | | | | | |
| 39 | 30 | 0.21 | 10 | 26 | 5 | 8,000 | 0.6 | 93 | 45 | | | | Grainy, dull. |
| 40 | 35 | 0.2 | 5 | 26 | 5 | 7,600 | 1.5 | 99 | 75 | 50 | 196 | 3.9 | Rippled, dull. |
| 41 | 35 | 1.5 | 5 | 26 | 5 | 7,700 | 1.4 | 98 | 75 | 44 | 175 | 4.0 | Grainy, dull. |
| 42 | 35 | 1.5 | 10 | 26 | 5 | 7,600 | 1.5 | 99 | 75 | 44 | 175 | 4.0 | Rippled, dull. |
| 43 | 35 | 3.0 | 10 | 26 | 5 | 7,600 | N.M. | 102 | 75 | 48 | 194 | 4.0 | Smooth, glossy, brittle. |
| 44 | 45 | 0.37 | 10 | 26 | 5 | 7,300 | 0.6 | 100 | 60 | 69 | 222 | 3.2 | |
| 45 | 35 | 0.48 | 5 | 34 | 5 | 8,200 | 0.7 | 100 | 60 | | | | |
| 46 | 35 | 0.48 | 5 | 50 | 5 | 8,600 | 0.7 | 102 | 60 | | | | |
| 47 | 35 | 0.64 | 5 | 34 | 5 | 8,300 | 0.7 | 99 | 45 | | | | |
| 48 | 35 | 0.64 | 5 | 50 | 5 | 8,500 | 0.7 | 100 | 60 | | | | |

¹ SA=styrene-acrylonitrile copolymer.
² BA=butadiene-acrylonitrile cross-linked copolymer.
³ Percent A=percent acrylonitrile in copolymer by weight.
⁴ DSV=dilute solution viscosity.
⁵ Phr=parts of copolymer per 100 parts by weight of post-chlorinated polyvinyl chloride.

It is worthy of reemphasis that the compositions of the instant invention comprise mixtures of post-chlorinated polyvinyl chloride and the *two* described copolymers. In our copending application, Serial No. 224,214, filed September 17, 1962, entitled "Post-Chlorinated Vinyl Chloride Polymer Compositions Having Improved Processability," we disclose that incorporating small amounts only of styrene-acrylonitrile copolymer into chlorinated polyvinyl chloride improves the processability thereof, but in this case the impact strength is slightly impaired or negligibly improved. Moreover, we have found that the addition of butadiene-acrylonitrile rubber alone to chlorinated polyvinyl chloride improves impact strength but does not aid processability. Surprisingly, the blends embodied herein, which contain both the styrene-acrylonitrile and butadiene-acrylonitrile copolymers, have good shock resistance, and in addition, even better processability than in the case of adding *only* the styrene-acrylonitrile resin to the chlorinated polymer.

Other modifications of the compositions of this invention are possible and it is to be understood that the specific examples described are for the purpose of illustration only. For instance, although the compositions embodied herein are free of the conventional plasticizers and processing aids, because they are easily molded, extruded, and calendered without them, it is desirable, however, to include in the mixture small amounts, i.e., 1 to 5 parts per hundred parts by weight of said compositions, of the conventional compounds useful as heat and light stabilizers. Examples of such stabilizers well known in the art are the barium, cadmium, zinc, tin, and lead salts of monocarboxylic acids, and the alkyl derivatives of tin, such as the dialkyl tin mercaptides and thiazoles. The pigments, fillers, and lubricants which are well known in the thermoplastics art also may be included in the compositions embodied herein.

We claim:

1. A composition comprising an intimate mixture of (a) 100 parts by weight of post-chlorinated polyvinyl chloride resin characterized by having a density of from about 1.53 to 1.59 grams per cc. at 25° C. and a chlorine content of from about 64 to 68% by weight, a heat distortion temperature, according to ASTM test method D648-56, within the range of 95° C. to 125° C., and high heat stability such that it is not degraded if exposed to air at 375 to 400° F. for at least 10 minutes; and (b) from 1 to 15 parts by weight of a resinous copolymer of styrene and acrylonitrile containing from 20 to 35% by weight of polymerized acrylonitrile units and having a dilute solution viscosity, measured in methyl ethyl ketone solvent at 25° C., of from 0.3 to 0.7; and (c) from 3 to 15 parts by weight of a cross-linked rubbery copolymer of butadiene and acrylonitrile containing from 20 to 30% by weight of polymerized acrylonitrile units, containing at least 50% by weight of gel the mixture characterized in that it is extrudable into pipe suitable for conveying water at a temperature within the range of at least 85° C. to about 100° C.

2. The composition according to claim 1 wherein the butadiene-acrylonitrile copolymer is partially cross-linked with from 0.25 to 3 parts, per 100 parts by weight of the copolymer, of polymerized units of a non-conjugated, ethylenically doubly-unsaturated monomer, the degree of cross-linking measured by a gel content of the copolymer of at least greater than about 50 percent by weight, as determined in methyl ethyl ketone solvent at 25° C.

3. The composition according to claim 1 wherein the post-chlorinated polyvinyl chloride resin has a density of from about 1.55 to 1.58 grams per cc. at 25° C., a chlorine content of from about 65.4% to 67% by weight and a heat-distortion temperature of at least 100° C.

4. The composition according to claim 3 wherein the butadiene-acrylonitrile copolymer is partially cross-linked with from 0.25 to 3 parts, per 100 parts by weight of the copolymer, of polymerized units of a non-conjugated, ethylenically doubly-unsaturated monomer, the degree of cross-linking measured by a gel content of the copolymer of at least greater than about 50 percent by weight, as determined in methyl ethyl ketone solvent at 25° C.

5. A composition comprising an intimate mixture of (a) 100 parts by weight of post-chlorinated polyvinyl chloride resin characterized by having a density of from 1.53 to 1.59 grams per cc. at 25° C. and a chlorine content of from about 64 to 68% by weight, a heat distortion temperature, according to ASTM test method D648-56, within the range of 95° C. to 125° C., and a high heat stability such that it is not degraded if exposed to air at 375 to 400° F. for at least 10 minutes; and (b) from 5 to 10 parts by weight of a resinous copolymer of styrene and acrylonitrile containing from 20 to 35% by weight of polymerized acrylonitrile units and having a dilute solution viscosity, measured in methyl ethyl ketone solvent at 25° C., of from 0.3 to 0.7; and (c) from 5 to 10 parts by weight of a cross-linked rubbery copolymer of butadiene and acrylonitrile containing from 20 to 30% by weight of polymerized acrylonitrile units, containing at least 50% by weight of gel the mixture characterized in that it is extrudable into pipe suitable for conveying water at a temperature within the range of at least 85° C. to about 100° C.

6. The composition according to claim 5 wherein the butadiene-acrylonitrile copolymer is partially cross-linked with from 0.25 to 3 parts, per 100 parts by weight of the copolymer, of polymerized units of a nonconjugated, ethylenically doubly-unsaturated monomer, the degree of cross-linking measured by a gel content of the copolymer of at least greater than about 50 percent by weight, as determined in methyl ethyl ketone solvent at 25° C.

7. The composition according to claim 5 wherein the post-chlorinated polyvinyl chloride resin has a density of from about 1.55 to 1.58 grams per cc. at 25° C., a chlorine content of from about 65.4% to 67% by weight and a heat-distortion temperature of at least 100° C.

8. The composition according to claim 7 wherein the butadiene-acrylonitrile copolymer is partially cross-linked with from 0.25 to 3 parts, per 100 parts by weight of the copolymer, of polymerized units of a non-conjugated, ethylenically doubly-unsaturated monomer, the degree of cross-linking measured by a gel content of the copolymer of at least greater than about 50 percent by weight, as determined in methyl ethyl ketone solvent at 25° C.

References Cited by the Examiner

UNITED STATES PATENTS

| 2,808,387 | 10/1957 | Parks et al. | 260—891 |
| 2,924,545 | 2/1960 | Daly | 260—891 X |
| 2,996,489 | 8/1961 | Dannis et al. | 260—92.8 |
| 3,108,988 | 10/1963 | Burri | 260—891 |

FOREIGN PATENTS 854,089  11/1960  Great Britain.

MURRAY TILLMAN, *Primary Examiner.*

G. F. LESMES, *Assistant Examiner.*